F. E. WOLF.
FLUID TURBINE.
APPLICATION FILED OCT. 18, 1907.

914,625.

Patented Mar. 9, 1909.
2 SHEETS—SHEET 1.

Witnesses:

Inventor:
Franz Emil Wolf

F. E. WOLF.
FLUID TURBINE.
APPLICATION FILED OCT. 18, 1907.

914,625.

Patented Mar. 9, 1909.
2 SHEETS—SHEET 2.

UNITED STATES PATENT OFFICE.

FRANZ EMIL WOLF, OF KLEIN-GLIENICKE, NEAR POTSDAM, GERMANY.

FLUID-TURBINE.

No. 914,625.   Specification of Letters Patent.   Patented March 9, 1909.

Application filed October 18, 1907. Serial No. 398,136.

*To all whom it may concern:*

Be it known that I, FRANZ EMIL WOLF, a subject of the Emperor of Germany, residing at Klein-Glienicke, near Potsdam, Germany, have invented certain new and useful Improvements in Fluid-Turbines; and I do hereby declare the following to be a full, clear, and exact description of the invention, such as will enable others skilled in the art to which it appertains to make and use the same.

My invention relates to improvements in fluid turbines and more particularly to that class of turbines in which the energy of the fluid is not imparted to the rotor by means of buckets or vanes, but by the friction of the motive fluid on the walls of the rotor, which rotor comprises a plurality of sections successively receiving the fluid. And the object of the improvements is to increase the efficiency of turbines of this class. For this purpose the turbine is so constructed, that the impact of the fluid on the sections of the rotor is always in the direction of the travel of the particular section, whereby a maximum of the energy of the fluid is imparted to the rotor. To effect this, the fluid is forced spirally over the surfaces of a plurality of rigidly connected rotor sections the operative or friction surfaces of which are located radially one above the other, whereby, on each of the rotor sections, a force is exerted by friction, which is in the direction of the travel of the surface of each section. By this arrangement, the fluid exerts its force over a long distance of the rotor surface, so that the speed of the rotor is small and a maximum of the energy of the fluid is imparted thereto. Therefore, the efficiency of my improved turbine is high, while the diameter of the rotor is small, and the turbine can be manufactured at a low price, and it is particularly adapted for wholesale manufacture.

For the purpose of illustrating the invention I have shown several examples of turbines embodying the same in the accompanying drawings, in which the same characters of reference have been used in all the views to indicate corresponding parts.

Figure 1:
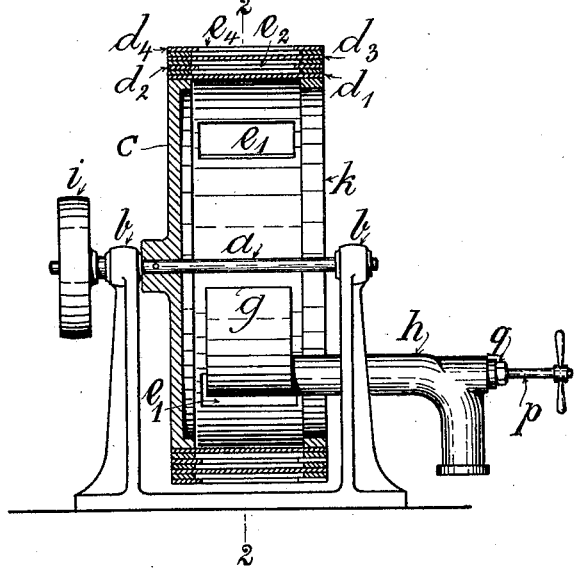
Figure 2:
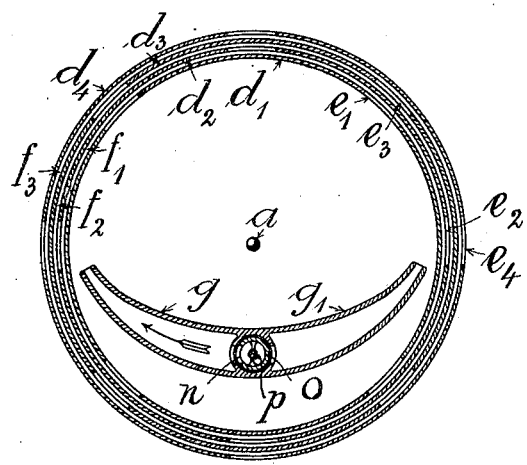
Figure 3:
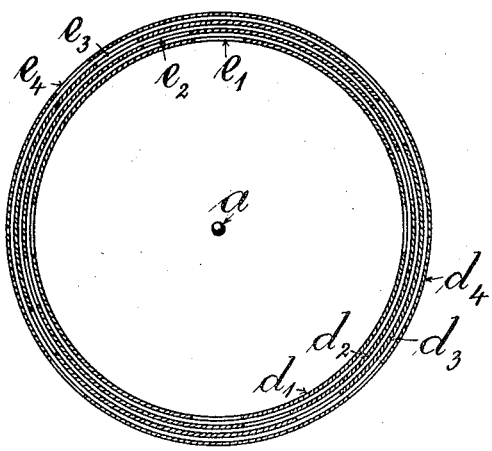
Figure 4:
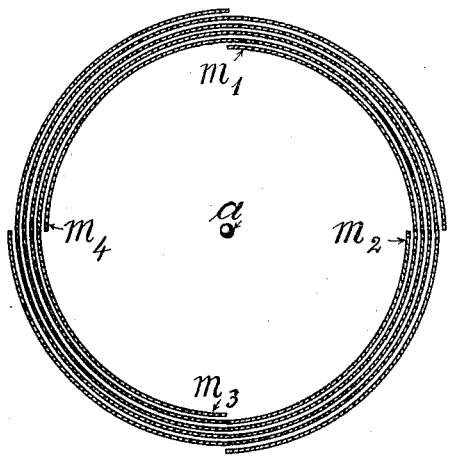

In said drawings—Figure 1, is a vertical cross-section of a turbine embodying my invention, Fig. 2, is a cross-section of Fig. 1, taken on the line 2—2, Fig. 3, is a vertical cross-section of a second example of the rotor, taken on a plane vertical to the rotor shaft, and Fig. 4 is a cross-section similar to that of Fig. 3, and illustrating a further example of the invention.

Referring particularly to the example illustrated in Fig. 1, on a shaft $a$ supported in suitable bearings $b$ a rotor or drum $c$ is mounted which, preferably, is open at one side and closed at the opposite side. The rotor or drum comprises a plurality of concentric sheet metal cylinders $d_1$, $d_2$, $d_3$, and $d_4$, radially located at a suitable distance from one another. The cylinders are provided with a plurality of apertures $e_1$, $e_2$, $e_3$, $e_4$, respectively, arranged substantially at equal distances from one another. In the example illustrated, each of the cylinders is made with four apertures. Through the said apertures, the annular spaces $f_1$, $f_2$, and $f_3$, formed by consecutive cylinders communicate with one another, and the apertures of consecutive cylinders are so located relatively to one another, that each of the apertures of one of the cylinders has substantially the same distance from the nearest apertures of the adjacent cylinders. If, therefore, in each of the cylinders four apertures are provided, consecutive apertures of adjacent cylinders are displaced relatively to each other at an angle of 45°, as will readily appear from Fig. 2. The arrangement of the apertures on the cylinders, such as described, is not always necessary, but in reversible turbines the operative or friction surfaces for the fluid on the rotor sections have a maximum length, when the turbine is rotating in either direction.

Within the rotor $c$, a nozzle $g$, or a plurality thereof, is located the discharge end of which is slightly inclined toward the inner cylindrical wall of the rotor. The nozzle is connected to a tube $h$ through which the motive fluid, such as water, steam, compressed air, or the like, is admitted thereto. At the inner side of the rotor, and at the open part thereof, a ring $k$ is provided, whereby the motive fluid is prevented from being forced outside the rotor.

In case of a reversible turbine an oppositely directed nozzle $g^1$ is provided, as shown in Fig. 2. In this case, the tube $h$ is provided with a rotary piston valve $o$ having an opening $n$ adapted to be made to register with either one of the nozzles $g$ or $g^1$, according to the direction in which the turbine is desired to revolve. The said piston valve may be controlled by means of a rod $p$ extending through a stuffing box $q$ of the pipe $h$. Power is derived from the turbine shaft $a$ by means of a pulley $i$ or a similar mechanism.

The motive fluid discharged through the nozzle at first strikes the inner surface of the cylinder $d_1$, and, while flowing along the latter and forced against the same by its centrifugal force, takes along the rotor by friction caused by its adhesion to the surface, so as to rotate the rotor. Now, the fluid having a greater velocity than the rotor, moves along the surface of the latter, until it meets one of the openings $e_1$. Through the latter, it passes into the annular space $f_1$, where it is forced against the inner surface of the second rotor section $d_2$, until it meets again one of the apertures $e_2$ and flows through the same into the annular space $f_2$, the apertures $e_3$ and the annular space $f_3$, from which it is discharged through the apertures $e_4$ of the last rotor section. On its whole path over the surfaces of the rotor sections the fluid exerts a driving force on the latter by friction. Therefore, for a comparatively small diameter of the rotor, a long operative path is produced for the fluid, whereby the energy of the latter can be completely utilized by so choosing the number of the cylinders and their apertures, that the velocity of the motive fluid when discharged from the rotor is equal to the circumferential speed of the latter, so that so much of the energy of the fluid as is represented by the difference of the velocity of the same when discharged through the nozzle and of the rotor is transformed into mechanical energy.
If it is desired to reverse the turbine, the nozzle $g$ is closed and the oppositely directed nozzle $g_1$ is opened, whereupon the turbine is operated in the same way as before, but in an inverse direction.
Where the reversibility of the turbine is not required, the construction illustrated in Fig. 3 will preferably be used, in which the surfaces of the rotor sections are completely utilized for transforming the energy of the motive fluid. In the said example, the apertures $e_1$ to $e_4$ of the cylinders $d_1$ to $d_4$ are displaced relatively to one another only a distance equal to or slightly larger than the length of the apertures, the apertures of each of the cylinders being in advance of the nearest aperture of the succeeding one. Therefore, the fluid passing through an aperture always strikes a section of the surface of the succeeding rotor section at one end of the same, and it will pass over the same, in the direction of the rotation of the rotor, to the next aperture. It will be seen, however, that a turbine of this construction cannot be reversed, because, when reversing the operation the fluid jet would directly pass through the adjacent apertures of the consecutive rotor sections, without flowing over the surfaces of said sections.

When following the path of the motive fluid within the rotor sections, it will be found that the said fluid follows a spiral way. The said spiral path will also be described by the fluid, if the sheet metal rotor sections have themselves a spiral shape, each section beginning at one of the apertures rotating in front of the nozzles, and extending to the outer circumference of the rotor. An example of the rotor of a turbine of this character is shown in Fig. 4, in which four spiral rotor sections $m_1$, $m_2$, $m_3$, $m_4$, are provided. In the said example, the passages for the fluid formed by a part of the spaces $f_1$, $f_2$, and $f_3$ and consecutive apertures $e_1$, $e_2$, $e_3$ and $e_4$, are formed between adjacent sheet metal rotor sections $m_1$, $m_2$, $m_3$, and $m_4$, the apertures shown in the examples of Figs. 2 and 3, not being required in this example.

The number of the superposed sheet metal rotor sections, and of the apertures therein may be varied at will according to the size of the turbine, and other conditions.

I claim:

1. In a turbine, the combination of a plurality of rigidly connected rotor sections having operative friction surfaces located radially one above the other and providing a spiral path for the motive fluid, and means to force the fluid against said friction surfaces substantially in the direction of the travel of said surfaces.

2. In a turbine, the combination of a plurality of rigidly connected rotor sections located radially one above the other and providing a spiral path for the motive fluid, and means to force the fluid against said sections substantially in the direction of the travel of the same.

3. In a turbine, the combination of a series of substantially annular radially spaced rotor sections providing a spiral path for the motive fluid, and a jet nozzle having its outlet inclined with respect to said rotor sections to deliver the fluid against said sections substantially in the direction of travel of the same.

4. In a turbine, the combination of a series of substantially annular radially spaced rotor sections providing a spiral path for the motive fluid, and a jetting device having oppositely disposed nozzles to deliver the fluid against said sections substantially in the direction of travel of the same, said jetting device having a valve to control the supply of fluid to the respective nozzles.

5. In a turbine, the combination of a drum mounted upon a shaft, a series of substantially concentric annular radially spaced walls located at the periphery of said drum, each wall having a discharge to the next radially disposed wall and a jet nozzle having its outlet inclined with respect to said walls to deliver the fluid against said walls substantially in the direction of travel of the drum.

6. In a turbine, the combination of a drum mounted upon a shaft, a series of substantially concentric annular radially spaced walls located at the periphery of said drum, each wall having a discharge to the next radially disposed wall and a jetting device comprising oppositely disposed nozzles and a controlling valve, whereby the fluid is delivered against the walls substantially in the directions of travel of the drum either forward or backward.

7. In a turbine, the combination of a drum mounted upon a shaft, a series of substantially concentric annular radially spaced walls located at the periphery of said drum, each wall having a series of spaced openings, the openings in successive walls being located intermediate the openings in the adjacent wall, and a jetting device comprising oppositely disposed nozzles and a controlling valve, whereby the fluid is delivered against the walls substantially in the directions of travel of the drum either forward or backward.

In witness whereof I have hereunto set my hand in presence of two witnesses.

FRANZ EMIL WOLF.

Witnesses:
HENRY HASPER,
WOLDEMAR HAUPT.